A. H. COWLES.
PROCESS OF MANUFACTURING SODIC-SILICO ALUMINATE AND HYDROCHLORIC ACID.
APPLICATION FILED OCT. 8, 1909.
1,041,598.
Patented Oct. 15, 1912.
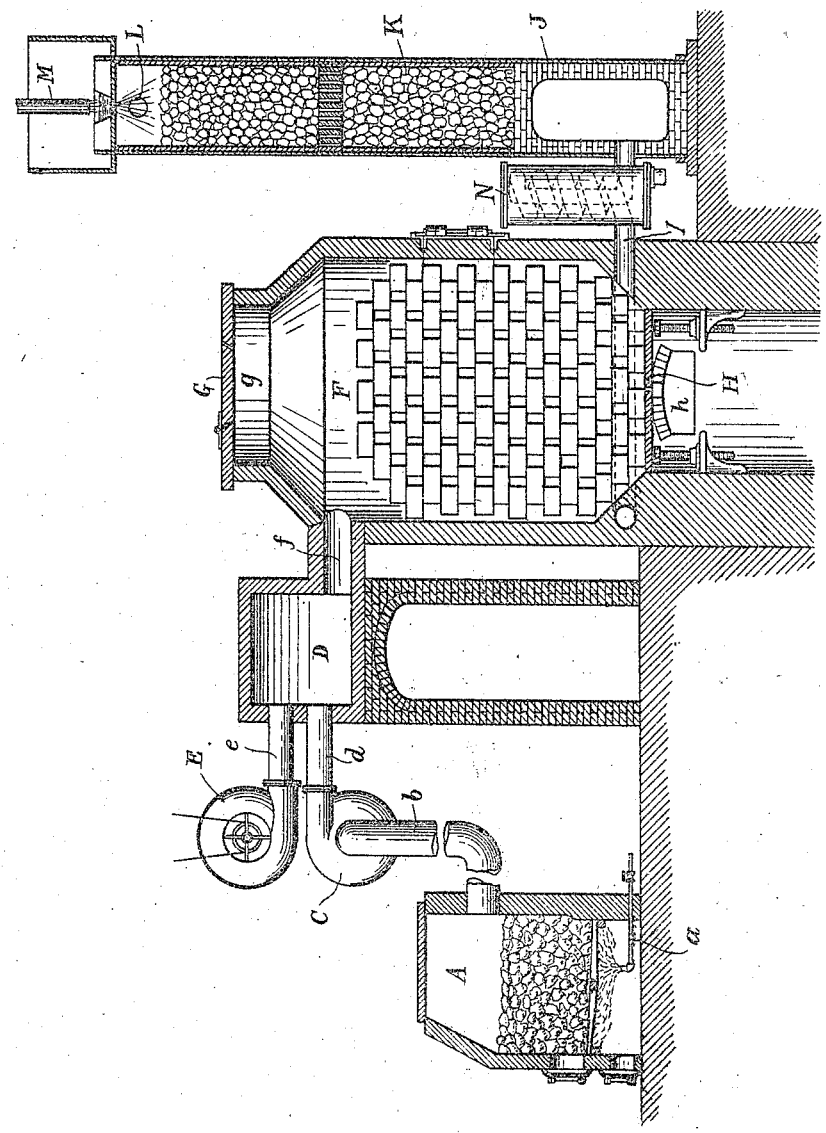
WITNESSES:
E. B. Gilchrist
H. B. Sullivan
INVENTOR.
Alfred H. Cowles
BY Thurston & Kwis
ATTORNEY.

UNITED STATES PATENT OFFICE.

ALFRED H. COWLES, OF LOCKPORT, NEW YORK, ASSIGNOR TO THE ELECTRIC SMELTING AND ALUMINUM COMPANY, OF LOCKPORT, NEW YORK, A CORPORATION OF ILLINOIS.

PROCESS OF MANUFACTURING SODIC-SILICO ALUMINATE AND HYDROCHLORIC ACID.

1,041,598. Specification of Letters Patent. Patented Oct. 15, 1912.

Application filed October 8, 1909. Serial No. 521,692.

*To all whom it may concern:*

Be it known that I, ALFRED H. COWLES, a citizen of the United States, residing at Lockport, in the county of Niagara and State of New York, have invented a certain new and useful Improvement in the Process of Manufacturing Sodic-Silico Aluminate and Hydrochloric Acid, of which the following is a full, clear, and exact description.

The present invention relates to the manufacture of sodic-silico-aluminate and hydrochloric acid.

The object of the invention has been to improve the manufacture of these compounds so that less time shall be consumed in the work and richer and more uniform products shall result.

The above objects it will be seen are attained by the process described in the following specification, in connection with which may be used the charge mixture disclosed in my companion application Serial No. 521,691, filed October 8th, 1909.

It has long been known that silica as well as alumina, or both combined, will, in the presence of steam, or vapor of water, decompose alkali chlorids at an elevated temperature. The alkali oxid formed combines with silica or alumina, or both, as the case may be, while the chlorin unites with the hydrogen of the water vapor to form hydrochloric acid. Many methods have been devised to utilize this reaction to build up a practical technical process and methods directed to this purpose appear in U. S. Patent No. 376,409, January 10, 1888 Kayser, and the English Patent 2050 of 1862. These processes, however, have not found successful application, on account of certain inherent defects. My present method, however, which forms the subject of this application, is one resulting in greater uniformity in and control over the resultant products and attended by greater rapidity of conversion.

I mix together the solid materials used in the process, which comprise compositions containing silica and alumina, which may be associated with more or less soda or potash chemically combined. Examples of such compounds are clay, bauxite, shale, carboniferous shale, slate and the feldspars. Along with these silica and alumina compounds I mix salt by which I mean sodium or potassium chlorid. In addition to the above materials, I have, in the mix, carboniferous material either naturally or artificially placed in the mass, ordinarily amounting to from 3 to 10 per cent. of the charge mixture the only object of said carbon being to burn out and leave the sodic-silico-aluminate porous and accessible to the gases. Examples of such carboniferous material are anthracite coal, coke, charcoal, carboniferous shale, bituminous coal and also sawdust. I should prefer that in the mass thus obtained 15 to 55 per cent. should be alumina and from 30 to 55 per cent. should be alkali chlorid. The mix is then formed in briquets and placed in a suitable down draft furnace. The steam, air and fuel gases, from oil, gas or powdered coal, are admitted from above and the waste gases together with vapor of water and the hydrochloric gas formed are drawn off from the bottom.

The necessary amount, by weight, of sodium chlorid, is substantially twice the weight of sodium oxid necessary for reaction with the clay. This necessary or permissible quantity of sodium oxid that can be employed with the clay, varies with the composition of the clay, the magnitude of the operation and the amount of carbonaceous matter that can be incorporated with the clay, without supplying the furnace with a surplus of fuel.

Using a clay containing from thirty per cent. to thirty-six per cent. of alumina, and having an efficient furnace capable of handling a large quantity of material, I have found a good mixture to consist of forty eight parts of clay containing its water of crystallization, forty eight parts of salt, and four parts of carbonaceous material. These proportions will vary with different conditions of operation and with varying compositions of materials.

Under the influence of an oxidizing atmosphere the carbon in the body of the lumps or briquets will burn, rendering them porous and more easily heated and penetrable by the enveloping gases. Furthermore, the very presence of the carbon as it burns away enables me to maintain an oxidizing atmosphere surrounding the partially transformed briquets or masses within the furnace during the operation, because of using less gaseous fuel and thus preventing the reduction of the alkali oxid after it has been formed by the action of the steam upon the alkali chlorid. Thus the alkali oxid is retained united with the silica and alumina present, in the form of sodic-silico-aluminate. The use of carbon in the bricks makes it possible to use a less and therefore cheaper fuel flame for raising the temperature. Further, the carbon when burning decomposes a portion of the steam or vapor of water; and consequently the hydrochloric acid gas formed in the reaction between the undecomposed steam and the alkali chlorid will pass off in a more concentrated condition and be more easily and less expensively collected. At the finish of the treatment it will be found that the oxidation of the carbon leaves the briquets or balls porous and friable and more readily subject to such opening processes as may be used for the purpose of obtaining the alumina, and alkali.

The temperature for obtaining the best results depends upon the quality of the mixture, varying from 1700 to 2400 Fahrenheit, according as the percentage of alumina in the mixture is increased or diminished. The higher the alumina content, the hotter the temperature employed, the higher the percentage in silica, the lower the temperature of reduction.

The determining factors as to the length of the process are the rates of progression of heat and steam from the surface to the interior of the bricks. Their penetration has heretofore been so slow as to cause the zone of action to proceed down the furnace at a comparatively slow rate with the ultimate result that a large part of the salt which is volatilized has been carried forward to the bottom of the furnace and deposited in a zone where reaction was not possible. I have discovered, however, that by carrying on the process with carboniferous material contained in the mass of the bricks, that the reaction will proceed far more rapidly and with far better control and greater uniformity than has heretofore been possible.

By reason of the carbon being in the body of the bricks and the combustion taking place therein at the same time that the exterior flame is being applied, the bricks will be raised to the proper temperature for reaction quickly and with much less volume of gaseous fuel than is possible otherwise. This results in the hydrochloric acid gas formed passing off in a more concentrated condition and therefore more easily and less expensively handled and collected. Further, by reason of the burning of the carbon in the mass of the bricks, it is possible to supply a large proportion of air along with the gaseous fuel without lowering the temperature and yet maintaining an oxidizing atmosphere within the furnace. The maintenance of this oxidizing atmosphere is a distinct advantage, since it prevents the escape downward of sodium or volatile aluminum chlorid through their immediate oxidation at the high temperature. Under non-oxidizing conditions there is liable to result a carrying forward of the aluminum chlorid and the sodium, which are deposited in various forms in the lower part of the furnace. Finally, the burning of the carbon in the bricks leaves them more porous and easily penetrated by the steam, so that reaction proceeds more rapidly. This is a decided advantage since one of the greatest drawbacks to the previous method of procedure has been the extreme slowness with which any results are accomplished. The sodic or silico-sodic-aluminate that can be made by this process may be made completely free from iron as an impurity, though when a very large amount of air is forced through the furnace some iron oxid remains as a scale over the surface of the briquets.

The hydrocloric acid obtained in the above process is condensed and collected in the usual manner and the sodic-silico-aluminate bricks obtained are then opened so that the alumina may be obtained, either after the methods previously known or by any other desired means.

When the carbon is mixed in with the aluminous minerals and salt in the body of the lumps, that make up the charge, the resultant product can be produced white and perfectly free from all iron impurities. Hence I consider such a method of adding my carbon preferable to that of first making mixtures of clay and salt and with the blocks or lumps so made, mixing fragments of coal or coke to make up the charge. Where the charge contains such separate fragments of coal, I have found that iron oxid accumulates from impurities in the aluminous minerals employed, but such a charge mixture, other than giving me a less white and friable product, works the same as but much slower than in the case where the carbon is contained within the body of the lumps of the mixture.

In the accompanying drawing showing, by way of example only, an apparatus in which my process can be carried out, A represents a gas producer in which is contained the fuel, such as gas coke, etc., $a$ is the pipe supplying steam to the generator A, — $b$ is the pipe connecting the generator A with the blower C, which draws off the gas from the generator and discharges it through the pipe $d$ into the combustion chamber D, into which air is forced by the fan E, through the pipe $e$. From D the pipe $f$ conveys the mixed air and gases to the converter F, which has at the top a feed hole $g$ closed by a cover G, and it is provided at the bottom with a discharge opening furnished with the removable bottom H.

I is the pipe leading to a condenser whence the hydrochloric acid fumes pass to the acid tower K.

J is the base of the tower; K coke, or similar materials upon which the acid fumes mixed with water from the pipe M are condensed.

By the improvements above described I have rendered the production of sodic-silico-aluminate and hydrochloric acid commercially practical both by reason of the shortening of the time of the process, securing more concentrated hydrochloric acid fumes and by the uniformity of results secured, the latter being due in part to the rapidity of the process itself and the diminished volume of gas required.

The blocks of alumina, silicious matter, salt and carbonaceous material herein described are claimed in my copending application, Serial No. 521,691, filed October 8, 1909, and in my application Serial No. 637,346, filed July 7, 1911.

Having described my invention, I claim:

1. The herein described method which comprises treating a charge mixture consisting of an alkali chlorid, a carboniferous material and a composition containing silica and alumina, at a high temperature, with steam and air.

2. The herein described method which comprises treating a charge mixture consisting of an alkali chlorid, a carboniferous material and a composition containing silica and alumina, at a high temperature, with steam, and maintaining an oxidizing atmosphere in the reacting zone.

3. The herein described method which comprises treating a charge of lumps composed of an intimate mixture of an alkali chlorid, a carboniferous material and a composition containing silica and alumina, at a high temperature, with steam and air.

4. The herein described method which comprises treating a charge mixture consisting of a charge of lumps composed of an intimate mixture of an alkali chlorid, a carboniferous material and a composition containing silica and alumina, at a high temperature, with steam, and maintaining an oxidizing atmosphere surrounding said lumps in the reacting zone.

5. The herein described method which comprises treating an alkali chlorid, a carboniferous material and a composition containing silica and alumina, at a high temperature, with steam and air, the alkali chlorid being substantially between 30 and 55 per cent., the carboniferous material between 5 and 10 per cent. and the alumina between 15 and 55 per cent. of the charge.

6. The method of producing hydrochloric acid and an alkali-silico-aluminate, which consists in subjecting at a high temperature a porous mass containing alumina, salt and silica to the action of steam, the amount of steam introduced being such that sufficient hydrogen is supplied to combine with all the chlorin of the salt, plus such excess as to give strong hydrochloric acid when condensed.

In testimony whereof, I hereunto affix my signature in the presence of two witnesses.

ALFRED H. COWLES.

Witnesses:
J. M. WOODWARD,
H. R. SULLIVAN.